US010148413B2

United States Patent
Cassiau

(10) Patent No.: US 10,148,413 B2
(45) Date of Patent: Dec. 4, 2018

(54) METHOD FOR SYNCHRONISING AN FBMC SYSTEM USING A RACH CHANNEL

(71) Applicant: COMMISSARIAT A L'ENERGIE ATOMIQUE ET AUX ENERGIES ALTERNATIVES, Paris (FR)

(72) Inventor: Nicolas Cassiau, Saint Etienne de Crossey (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/454,721

(22) Filed: Mar. 9, 2017

(65) Prior Publication Data
US 2017/0264424 A1    Sep. 14, 2017

(30) Foreign Application Priority Data
Mar. 14, 2016  (FR) ..................... 16 52109

(51) Int. Cl.
*G06F 17/15*    (2006.01)
*H04B 1/709*    (2011.01)
(Continued)

(52) U.S. Cl.
CPC .......... *H04L 7/0033* (2013.01); *H04L 27/264* (2013.01); *H04L 27/265* (2013.01);
(Continued)

(58) Field of Classification Search
CPC ... H04L 27/264; H04L 27/265; H04L 7/0033; H04L 27/2662; H04L 27/2672; H04J 13/0029
See application file for complete search history.

(56) References Cited

U.S. PATENT DOCUMENTS 5,652,772 A * 7/1997 Isaksson ............. H04L 27/2613
                                                              375/367
6,546,056 B1 * 4/2003 Rosenlof ............. H04L 27/2662
                                                              375/260

FOREIGN PATENT DOCUMENTS

EP    2 879 341 A1    6/2015
WO    WO 95/03656    2/1995

OTHER PUBLICATIONS

French Preliminary Search Report dated Jun. 17, 2017 in French Application 16 52109 filed on Mar. 14, 2016 (with English Translation of Categories of Cited Documents).
(Continued)

*Primary Examiner* — Chieh M Fan
*Assistant Examiner* — Sung Ahn
(74) *Attorney, Agent, or Firm* — Oblon, McClelland, Maier & Neustadt, L.L.P.

(57) ABSTRACT

A method for synchronization of an emitter of FBMC system with a RACH channel. On the emitter, a pseudo-random sequence with an initial offset in relation to a reference sequence is inserted into the spectral band of the RACH channel. On the receiver, the sequence received on the RACH channel is estimated using a sliding FFT using a starting point and correlated with the reference sequence. The position of the starting point leading to the highest correlation peak is selected as well as the correlation position corresponding to this peak, with these two positions making it possible to determine the offset of the sequence received with the reference sequence. This offset is transmitted to the emitter and the latter deduces from it a delay to be compensated in the emission in order to synchronize with the receiver.

11 Claims, 11 Drawing Sheets

(51) Int. Cl.
*H04L 7/00* (2006.01)
*H04L 27/26* (2006.01)
*H04J 13/00* (2011.01)

(52) U.S. Cl.
CPC ...... *H04L 27/2662* (2013.01); *H04L 27/2672* (2013.01); *H04J 13/0029* (2013.01)

(56) References Cited

OTHER PUBLICATIONS

Vincent Berg et al. "A Flexible FS-FBMC Receiver for Dynamic Access in the TVWS," 2014 9th International Conference on Cognitive Radio Oriented Wireless Networks (CROWNCOM), 10.4108/icst.crowncom.2014.256666, 2014, pp. 6.

M.Bellanger et al. "FMBC physical layer: a primer," PHYDAS, http://www.ict-phydyas.org, Jun. 2010, pp. 31.

Botaro Hirosaki et al. "An Orthogonally Multiplexed QAM System Using the Discrete Fourier Transform." IEEE Transactions on Communications, vol. COM-29, No. 7, Jul. 1981, pp. 8.

Pierre Siohan et al. "Analysis and Design of OFDM/OQAM Systems Based on Filterbank Theory." IEEE Transactions on Signal Processing, vol. 50, No. 5, May 2002. pp. 14.

\* cited by examiner

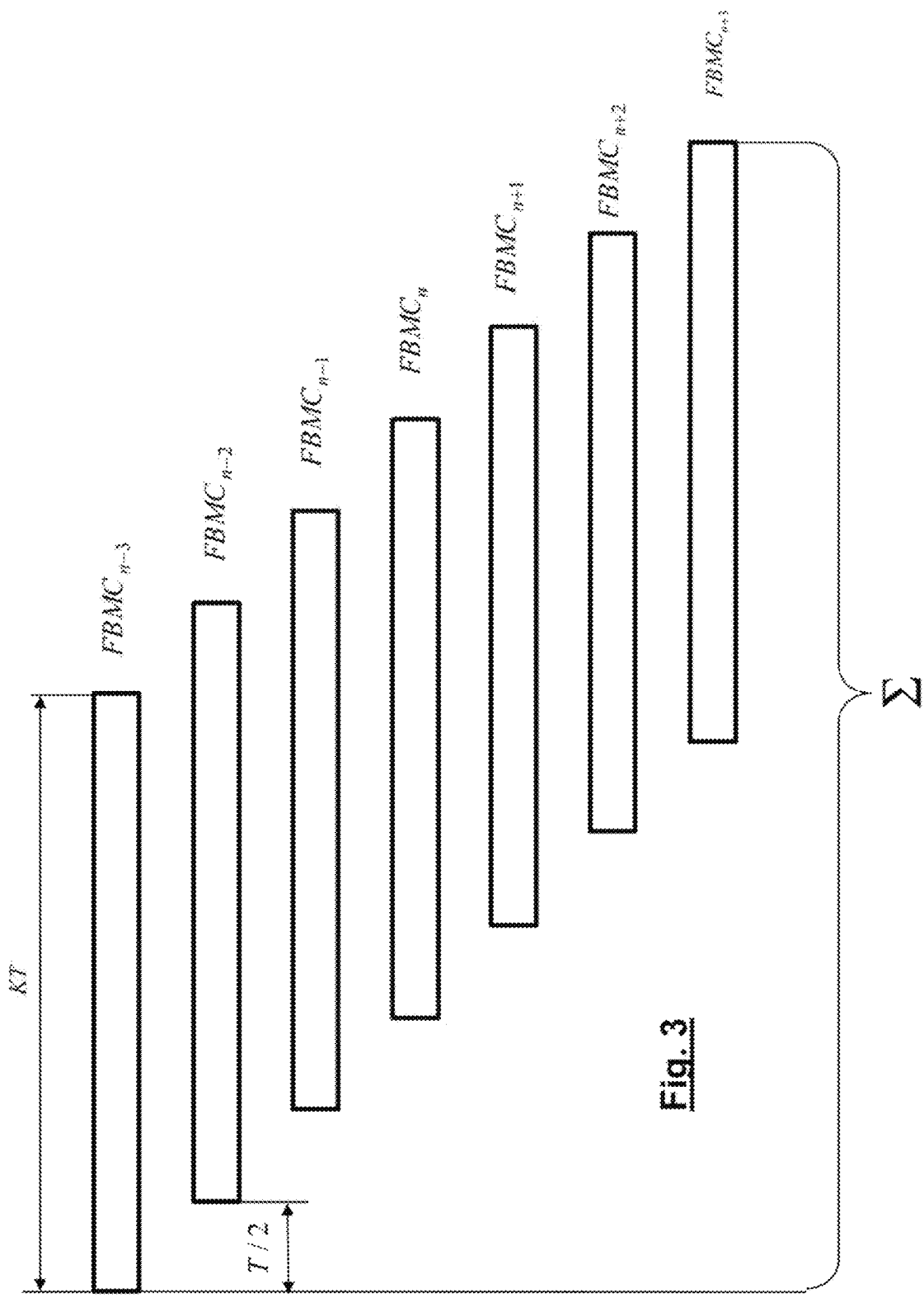

METHOD FOR SYNCHRONISING AN FBMC SYSTEM USING A RACH CHANNEL

TECHNICAL FIELD

This invention generally relates to the field of telecommunications systems that use FBMC (Filter Bank Multi-Carrier) systems.

PRIOR ART

Telecommunications systems that use a multi-carrier modulation are well known in prior art. The principle of such a modulation consists in dividing the transmission bandwidth into a plurality of frequency subchannels associated with subcarriers and in modulating each one of these subcarriers by the data to be transmitted.

The most widespread multi-carrier modulation is without a doubt OFDM (Orthogonal Frequency Division Multiplexing) modulation. However, as the spectral occupation of an OFDM signal is substantially greater than the subcarrier bandwidth that it uses because of the spreading of the secondary lobes, OFDM modulation is not an optimum solution for applications that require high out-of-band rejection rates.

Filter bank modulation or FBMC (Filter Bank Multi Carrier) is a multi-carrier modulation that makes it possible to obtain better spectral localising in the subcarrier bandwidth. It is furthermore one of the possible solutions for fifth-generation telecommunication systems.

The principle of FBMC modulation is based on a synthesis per filter bank at emission and an analysis per filter bank at reception, with the product of the transfer function of a filter at emission by the transfer function of the filter corresponding to the reception being equal to the transfer function of the Nyquist filter.

FBMC systems are conventionally implemented in the time domain. The structure of an FBMC system implemented in the time domain has been described in detail in the article by B. Hirosaki entitled "An orthogonally multiplexed QAM system using the discrete Fourier transform" published in IEEE Trans on Comm., vol. 29 No. 7, pp. 982-989, July 1981, as well as in the article by P. Siohan et al, entitled "Analysis and design of OFDM/OQAM systems based on filterbank theory" published in IEEE Trans. on signal processing, vol. 50, No 5, pp. 1170-1183, May 2002. The FBMC systems implemented in the time domain make use of polyphase filter networks giving them their denomination as PPN-FBMC (Polyphase Network FBMC).

More recently, it has been proposed to implement an FBMC system in the frequency domain as described in the document by M. Bellanger et al. entitled "FBMC physical layer: a primer" available on the website www.ict-phydyas.org. The FBMC systems implemented in the frequency domain make use of a spectral spread giving them their denomination as FS-FBMC (Frequency Spread FBMC).

The structure of an FS-FBMC system is shown in FIG. 1.

On the emitter, the QAM modulation symbols to be transmitted with a rate Nf with f=1/T are grouped together by blocks of size N, $x_0[n], \ldots, x_{N-1}[n]$ where n is the time index of the block. Each block of N symbols is supplied in parallel to N input channels of a preprocessing module, 110, referred to as OQAM preprocessing (Offset QAM). This preprocessing module has for function to demultiplex the real part and the imaginary part of the input symbols with a frequency 2f in such a way that two samples transmitted at the same instant on two successive subchannels or two samples transmitted in two successive instants on the same subchannel are one being real and the other imaginary. Each one of the N output channels of the preprocessing module 110 corresponds to a subchannel.

Each subchannel is then spread over an interval of 2 K−1 adjacent subcarriers, centred on a central subcarrier of the subchannel. More precisely, each OQAM data is spread over 2 K−1 adjacent subcarriers and weighted by the value (real) taken by the transfer function of the synthesis filter at the corresponding frequency.

The reference 120 designates the module for spreading in frequency and for filtering by the prototype filter. Each piece of OQAM data $d_i[n]$ as input of the module 120 is spread over 2K−1 adjacent subcarriers in order to give:

$$\tilde{d}_{i,k}[n] = d_i[n]G_k, k=-K+1, \ldots, 0, \ldots K-1 \quad (1)$$

The data with the same parity i and i+2 are spectrally separated and those with opposite parities i and i+1 overlap as shown in FIG. 2A. This overlapping does not however generate any interference since two pieces of data with opposite parities are necessarily respectively located on the real axis and the imaginary axis. For example, in FIG. 2A, the data $d_i[n]$ and $d_{i+2}[n]$ are real values (represented as solid lines) while the data $d_{i+1}[n]$ is an imaginary value (represented by dotted lines). The orthogonality in the complex plane is conserved by the filtering by the prototype filter given that the coefficients $G_k$ are real.

The filtered and frequency spread data are then subjected to an IFFT of size KN in 130.

The block of time samples at the output of the IFFT is combined using the combination module 140 as indicated in FIG. 3. The set of samples at the output of the IFFT represent an FBMC symbol in the time domain, with two successive FBMC symbols being offset by T/2 (in other words by N/2 samples). The FBMC symbols each have a duration KT (in other words a size of KN samples). An FBMC symbol is combined in the module 140 with the K−1 preceding FBMC symbols and K−1 following FBMC symbols. For this reason K is also called the overlapping factor. Note that a sample at the output of the combination module 140 is the sum of 2K−1 samples of consecutive FBMC symbols.

The signal obtained as such is then translated into RF band.

After transmission on the channel 150, the signal received, demodulated into baseband, is sampled by the receiver at the speed Nf then converted into blocks of size KN by the serial-to-parallel converter 160.

A sliding FFT (the window of the sliding FFT of N/2 samples between two calculations of FFT) of size KN is carried out in the FFT module, 170, on blocks of KN consecutive samples at the output of the serial-to-parallel converter 160.

The outputs of the FFT are then possibly equalised (equaliser not shown) then subjected to a filtering and a spectral dispreading in the module 180. The dispreading operation takes place in the frequency domain as shown in FIG. 2B. More precisely, the samples $\tilde{d}_{i,k}^r[n]$, k=−K+1, . . . , 0, . . . K−1 corresponding to the 2K−1 frequencies (i−1)K+1, . . . iK, . . . (i+1)K−1 of the FFT are multiplied by the values of the transfer function of the analysis filter (translated in frequency of that of the prototype filter) at the frequencies in question and the results obtained are added together, i.e.:

$$d_i^r[n] = \sum_{k=-K+1}^{K-1} G_k \tilde{d}_{i,k}^r[n] \quad (2)$$

Note that, as in FIG. 2A, obtaining data that has ranks of the same parity, for example $d_i'[n]$ and $d_{i+2}'[n]$, make use of disjoined sample blocks while those of two consecutive ranks, of inverse parities, overlap. As such, the obtaining of the data $d_{i+1}'[n]$ makes use of samples $\check{d}_{i,k}'[n]$, k=1, . . . , K−1 as well as samples $\check{d}_{i+2,k}'[n]$, k=−K+1, . . . , 1.

The dispreading of real data is shown as solid lines while that for imaginary data is shown as dotted lines.

The data $d_i'[n]$ obtained as such is then supplied to a post-processing module 190, carrying out the processing that is inverse to that of the module 110, in other words a OQAM demodulation. The QAM symbols are as such restored.

The FBMC technology is one of the candidate technologies for the fifth generation of wireless telecommunications systems. The wireless telecommunications systems of the third (UMTS) and fourth (LTE) generations make use of a random access uplink channel or RACH (Random Access Channel) in order to allow a mobile terminal or UE (User Equipment) to establish a connection with a base station (BS or eNodeB according to the generation).

The RACH channel is a channel common to all of the UEs and the latter access it in an unsynchronised manner, generally according to an access conflict protocol (contention based multiple access) in order to transmit the sending of control information to the base station and synchronise with it.

In LTE systems, the transmission on the RACH channel uses specific preambles that occupy an interval of subcarriers at a position specified by a network parameter. A preamble contains complex Zadoff-Chu sequence that has been offset by certain number of samples, with the offset in question allowing the base station to discriminate the various UEs.

The purpose of this invention is to propose a method for synchronising that allows an emitter (on a terminal) to synchronise itself with a receiver (on a base station) of an FBMC system by means of an access channel, in particular a RACH channel. This invention also proposes a RACH channel structure allowing for an implementation of this method for synchronisation.

DISCLOSURE OF THE INVENTION

This invention is defined by a method for synchronising an emitter with a receiver of an FBMC system, wherein a pseudo-random sequence is inserted, on the emitter, into an access channel defined by an interval of subcarriers of an FBMC frame, with said pseudo-random sequence having a given offset, $C_v$, with respect to a reference sequence with real values, and that t the level of the receiver:

(a) a sliding FFT of the received signal of size KN is carried out using a starting sample with a given index (i=0), with the window of the FFT sliding by N/2 samples between two successive FFT where N is the number of subcarriers of an FBMC symbol and K is the overlapping factor;

a sequence received on said canal is extracted from the FFT sequence received is correlated with the reference pseudo-random sequence;

(c) the correlation peak between these two sequences is determined and, with respect to the index of the starting sample, a metric of the correlation peak is stored in memory as well as the correlation position that corresponds to this peak;

with the steps (a), (b), (c) being repeated for a plurality of indexes of the starting sample and (d) the index, $i_{max}$, of the starting sample associated with the correlation peak of the maximum metric is determined as well as the correlation position, $j_{max}$, corresponding to this maximum metric correlation peak;

(e) the offset, $\tau_{tot}^{seq}$, is determined between the sequence received and the reference sequence using the index $i_{max}$ and the correlation position $j_{max}$, with the receiver transmitting to the emitter the offset determined as such;

(f) the emitter estimates a delay using the offset determined as such and the given offset, and compensates this delay at the emission.

According to a first embodiment, the steps (a), (b), (c) are repeated for N/2 successive indexes of the starting sample, with two successive indexes being separated by 1.

Advantageously, in the step (f), the delay τ is determined by the emitter using $$\tau = \frac{N}{2N_p}(\tau_{tot}^{seq} - C_v)$$

where $N_p$ is the number of subcarriers of the interval of subcarriers of said access channel.

According to a second embodiment, the steps (a) (b), (c) are repeated a first time, during a first search pass, for a first plurality $$\left\lceil \frac{N}{2P} \right\rceil$$

of indexes of the starting sample, with two successive indexes being separated by P where P is a quantification step denominated in number of samples, and the steps (a), (b), (c) are repeated at least a second time, during a second search pass, for a second plurality P of indexes in the range $$\left[\ell_{max}P - \frac{P}{2}, \ell_{max}P + \frac{P}{2}\right],$$

where $l_{max}$ is an estimate index in the first search pass.

Advantageously, the index $l_{max}P$ is determined, during the first search pass, such as the one belonging to the first plurality of starting sample indexes and associated with a first maximum value of a metric of the correlation peak $(A_{max}^1)$ of the sequence received with the reference sequence, with said first maximum value being obtained on said first plurality of indexes.

The index $i_{max}$ of the starting sample is then determined, during the second search pass, as the one belonging to the second plurality of starting sample indexes and associated with a second maximum value of a metric of the correlation peak $(A_{max}^2)$ of the sequence received with the reference sequence, with said second maximum value being obtained on said second plurality of indexes.

The correlation position, $j_{max}$, corresponding to the correlation peak of maximum amplitude during the second search pass, is determined.

The offset, $\tau_{tot}^{seq}$, between the sequence received and the reference sequence is advantageously obtained using the index $i_{max}$ and the correlation position $j_{max}$, such as determined by the second search pass.

The delay τ can be determined by the emitter using $$\tau = \frac{N}{2N_p}(\tau_{tot}^{seq} - C_v)$$

where $N_p$ is the number of subcarriers of the interval of subcarriers of said access channel.

More preferably, said reference sequence is a Gold sequence.

BRIEF DESCRIPTION OF THE DRAWINGS

Other characteristics and advantages of the invention shall appear when reading preferred embodiments of the invention given in reference to the attached figures among which:

FIG. 3 shows the combination of the FBMC symbols in FIG. 1;

DETAILED DESCRIPTION OF PARTICULAR EMBODIMENTS

An FBMC telecommunication system shall be considered in what follows that comprises at least one base station and a terminal (UE). In order to connect to the base station, the terminal emits a packet of FBMC symbols on a random access uplink channel or RACH.

Figure 4:
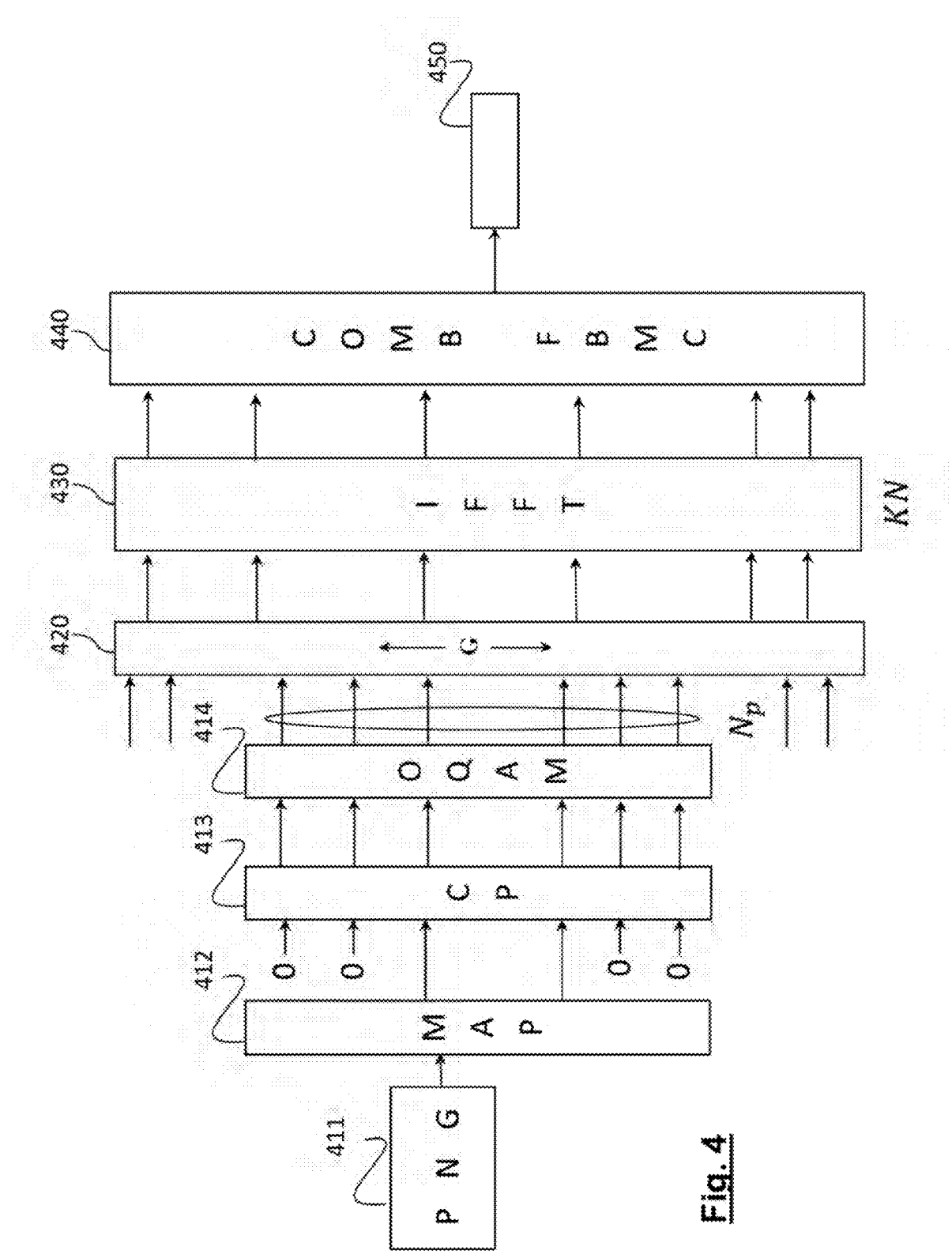
FIG. 4 diagrammatically shows the structure of an emitter on the RACH channel of an FBMC system.

FIG. 4 diagrammatically shows the structure of an emitter FBMC suitable for emitting on the RACH channel. The emitter is located on a terminal (UE). The structure of the emitter is similar to that of the FS-FBMC emitter shown in the left part of FIG. 1. The elements 420 to 450 are respectively identical to the elements 120 to 150 and their description therefore shall not be included here. Only the RACH channel is considered here, in other words the symbols transmitted on this channel. As is shown in the figure, other OQAM symbols coming from other channels can of course be present at the input of the module for spectral spreading and for filtering by the prototype filter, 420.

A generator 411 generates a pseudo-random sequence with real values that has good autocorrelation and offset detection properties. Good autocorrelation properties means that the correlation of the random sequence with itself gives a highly pronounced peak for a zero offset. Good offset detection properties means that the correlation between two sequences offset by a determined offset gives a highly pronounced peak for the value of this offset. An example of such a pseudo-random sequence is the Gold sequence with values in $\{-1,+1\}$.

The generator 411 generates the pseudo-random sequence conventionally using one or several registers with an offset relooping on themselves, the taps on register being determined by the coefficients of a generator polynomial, in a manner known per se. In the case of a Gold sequence, the generation is carried out by means of two offset registers each generating an M-sequence (primitive generator polynomials), with the outputs of two registers being combined together by means of an exclusive OR.

Each terminal in the cell is characterised by the offset, noted as $C_v$, of its pseudo-random sequence in relation to a reference sequence (corresponding to a predetermined initialization of the offset registers). In other words, each terminal can be identified by its offset $C_v$, with the terminal generating the reference sequence with an offset $C_v$ from elements of the sequence.

The sequence generated in 411 is then subjected to a "mapping" on the transmission resource associated with the RACH channel in the module 412. More precisely, the elements of the sequence are placed on subcarriers of a frequency interval (chunk) and even several frequency intervals allocated to the RACH channel during a predetermined interval of time. The module 413 concatenates to the frame of FBMC symbols a cyclic prefix CP as described hereinbelow. The FBMC symbols of the frame increased with its cyclic prefix are then subjected to a OQAM modulation in the modulator 414 before being supplied to the module 420. The OQAM modulator has for function to ensure a dephasing by π/2 between two consecutive samples in time and in frequency in such a way that the values carried at the same instant by the subcarriers are alternatively real and imaginary and that the values carried by the same subcarrier in successive instants are also alternatively real and imaginary.

Figure 5:
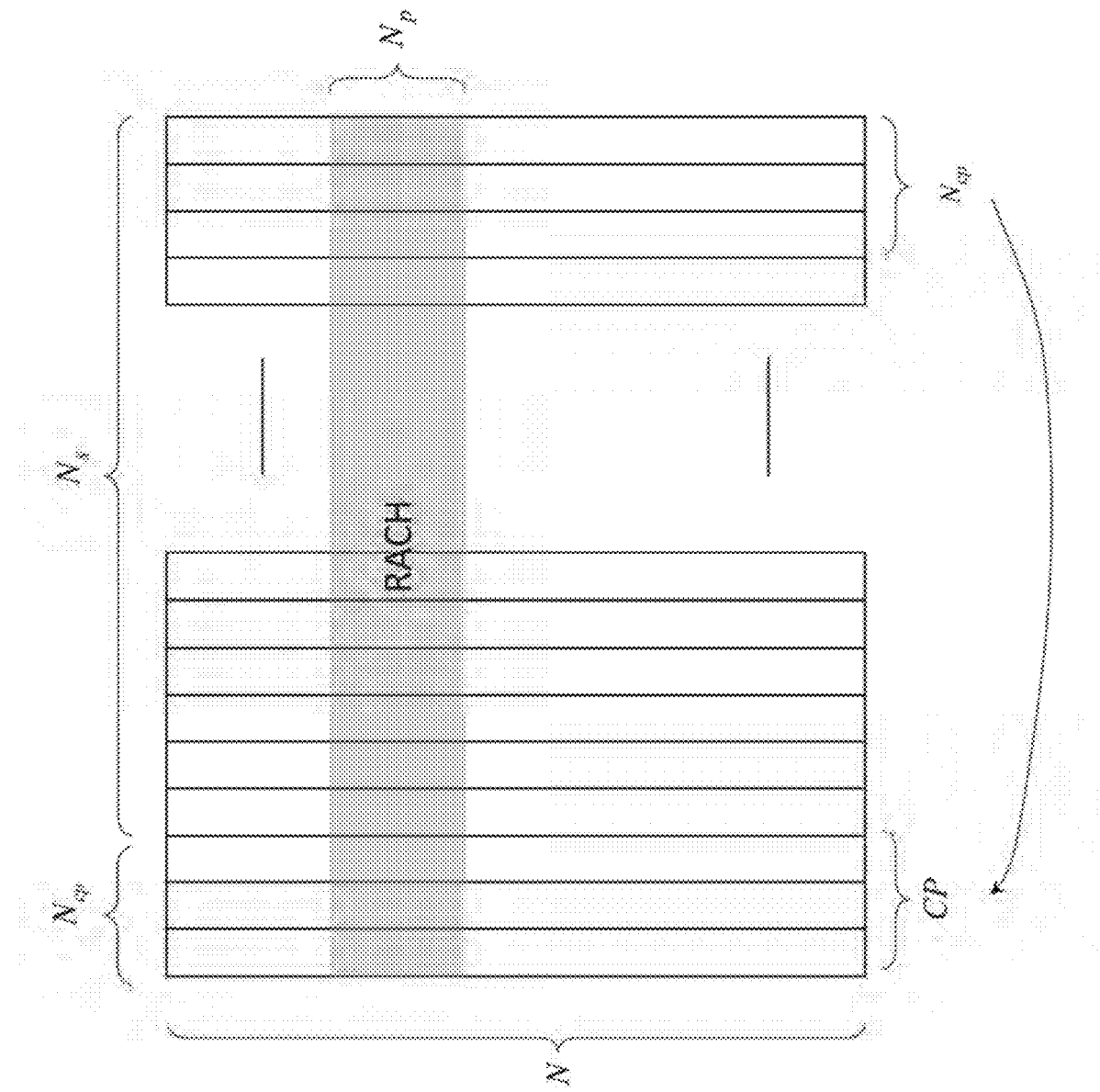
FIG. 5 diagrammatically shows the structure of a frame to be transmitted on the RACH channel of an FBMC system.

FIG. 5 shows a frame of FBMC symbols in the frequency domain, intended to be transmitted on the RACH channel by the emitter of FIG. 4. The horizontal axis represents time and the ordinate axis represents the frequencies. The FBMC symbols are shown here before the frequency spread in 420. The RACH channel occupies an interval, of subcarriers that is allocated to it, formed of $N_p$ subcarriers (strictly speaking $N_p$ subchannels when taken before the spectral spreading).

The number $N_x$ of FBMC symbols occupied by the sequence, before the adding of the cyclic prefix, is given by:

$$N_x = \lceil N_{pm}/N_p \rceil \quad (3)$$

where $N_{pm}$ is the length of the pseudo-random sequence and $\lceil\ \rceil$ means the integer portion by excess. If $N_{pm}/N_p$ is not an integer, the last FBMC symbol is supplemented with $N_xN_p - N_{pm}$ zero values (zero padding).

The frame of $N_x$ FBMC symbols is supplemented by concatenation of $N_{xp}$ OFDM symbols obtained by recopying the $N_{xp}$ last FBMC symbols at the beginning of the frame in order to form a cyclic prefix. The cyclic prefix obtained as such was designated by CP in the figure. The total length of the frame is therefore $N_x + N_{cp}$ FBMC symbols.

The adding of the cyclic prefix is required to absorb the propagation time in the cell. The number $N_{cp}$ will be chosen in such a way that $N_{cp} > 2R_{max}/(cT)$ where $R_{max}$ is the maximum radius of the cell, c the propagation speed of light and T/2 is the emission period of the FBMC symbols.

The FBMC symbols of the frame shown in FIG. 5 are subjected to spectral spreading in 420 then to IFFT of size KN in 430, parallel-to-series conversion in 440 before being combined in 450.

Figure 6:
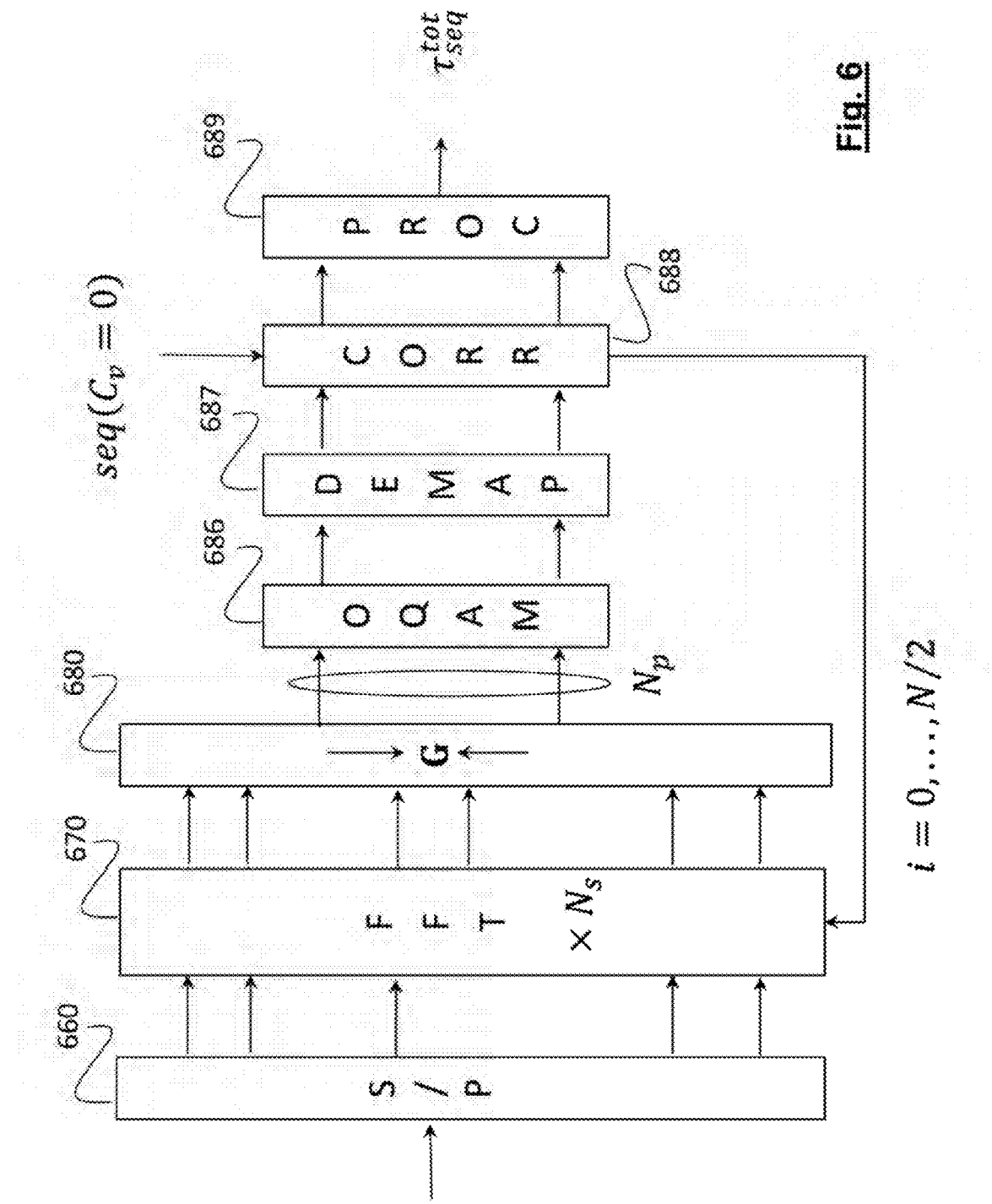
FIG. 6 diagrammatically shows the structure of receiver of an FBMC system, according to a first embodiment of the invention.

FIG. 6 shows the structure of a receiver suitable for receiving the RACH channel of are FBMC system, according to a first embodiment of the invention. The receiver is located here on the base station.

Figure 1:
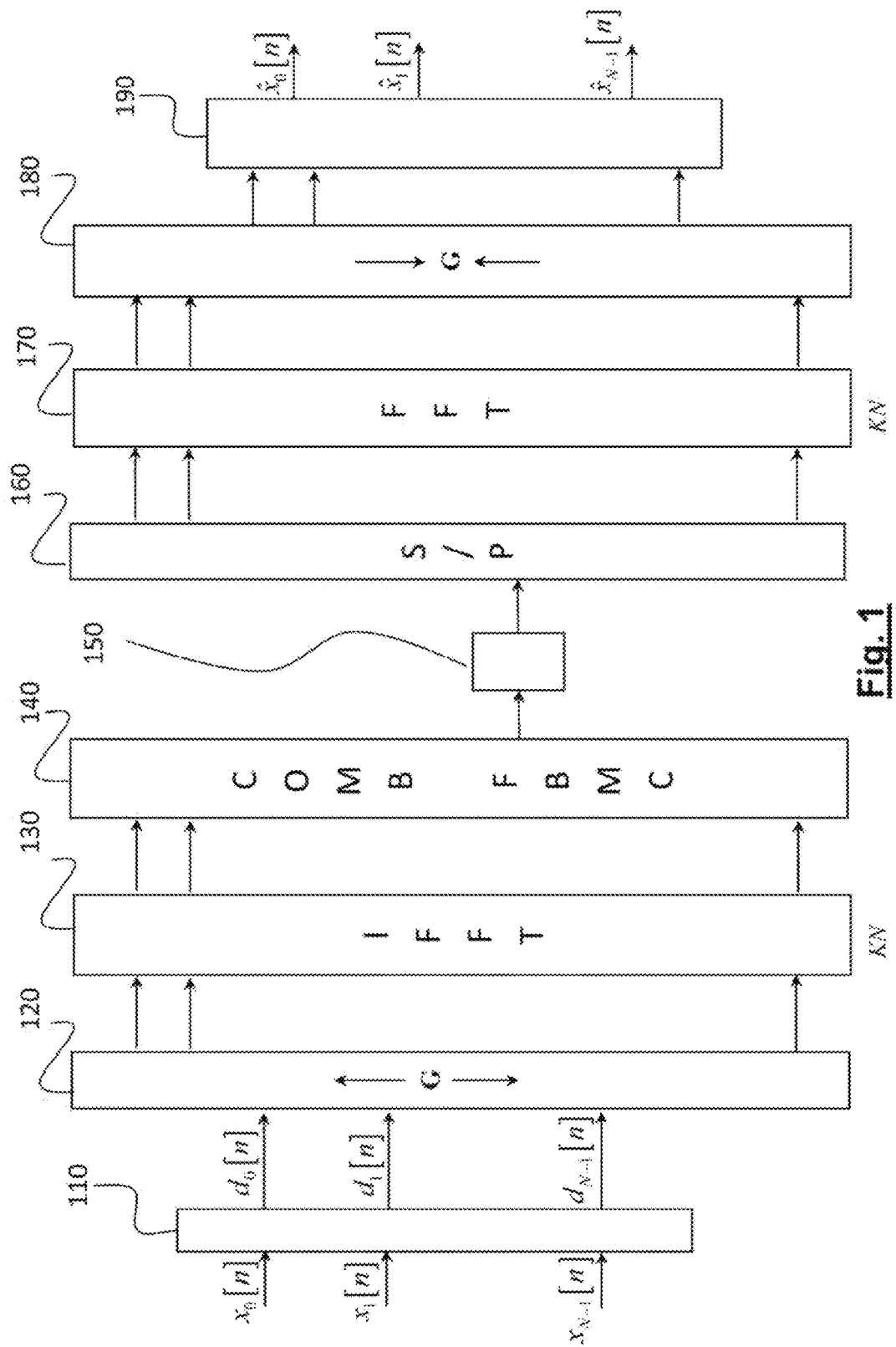
FIG. 1 diagrammatically shows an FS-FBMC telecommunications system known from prior art.
Figure 2A:
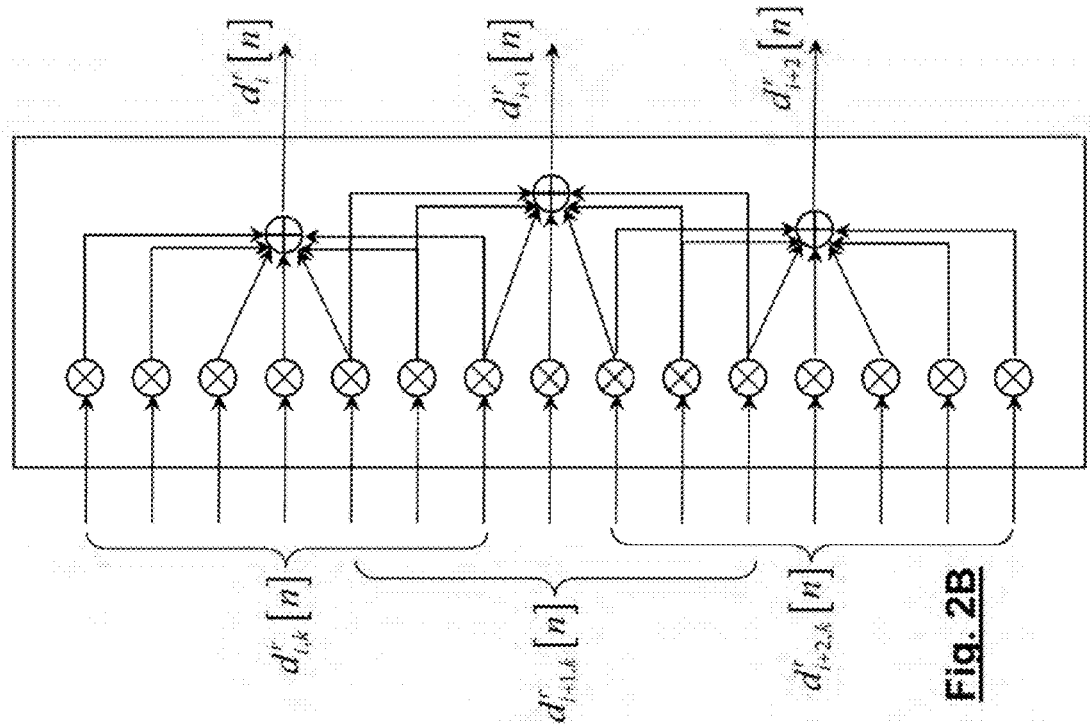
FIG. 2A shows the spectral spreading carried out upstream of the IFFT module of FIG. 1.
Figure 2B:
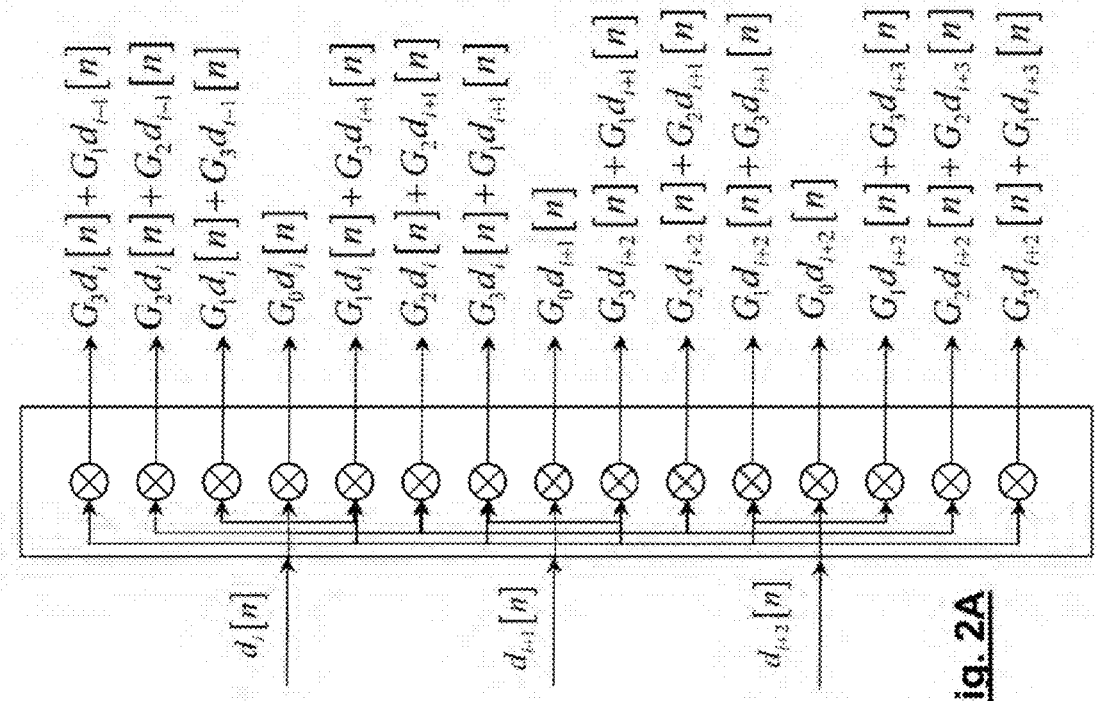
FIG. 2B shows the spectral dispreading carried out downstream of the FFT module in FIG. 1.

The structure of the receiver is similar to that of the receiver FS-FBMC shown in the right side of FIG. 1. The elements 660 to 680 are respectively identical to the elements 160 to 180 and their description therefore shall not be included here. A demultiplexer (not shown) at the output of the spectral despreading module 680 (even at the output of the FFT module 670) makes it possible to extract the OQAM data corresponding to the RACH channel. The data extracted as such is demodulated by a OQAM demodulator 686 that restores the elements of the sequence.

A formatting module 687 placed end-to-end the sequence portions acquired at each FBMC symbol of the frame. The acquisition is carried out for $N_s$ successive FFT on blocks of KN samples, with each block being offset by N/2 samples in relation to the preceding. The first FFT is carried out on a block of KN samples beginning with any sample of the sequence, taken as a reference sample. The index of this sample is chosen conventionally i=0. The processing carried out afterwards is based on the hypothesis that this sample is the first sample of the frame.

The sequence supplied by the formatting module is correlated in the correlator 688 with the reference pseudo-random sequence, i.e. the pseudo-random sequence with time offset $C_v = 0$.

The operation is repeated by incrementing the index i of the reference sample by 1 and this, until i=N/2.

A processing module 689 processes the correlation results supplied by the correlation module for i=1, . . . , N/2. More precisely, for each value of i, the processing modal acquires the amplitude A(i) of the correlation peak and the index $j_{max}(i)$ of the offset (in relation to the reference sequence) that corresponds to this peak.

The processing module determines using A(i) and $j_{max}(i)$, i=1, . . . , N/2, the total offset $\tau_{tot}^{seq}$ of the pseudo-random sequence received in relation to the reference sequence, with this offset comprising, on the one hand, the offset $C_v$ of the initial sequence (in other words the sequence as transmitted) and the offset due to the delay $\tau$ between the beginning of the frame and the reference sample.

The total offset $\tau_{tot}^{seq}$ is then transmitted to the UE in such a way that the latter can synchronise itself in relation to the base station. Indeed, the terminal, knowing the offset $C_v$, can deduce from it the delay $\tau$ and compensate for it at emission in such a way that a frame of FBMC symbols transmitted by the UE is received at the beginning of an interval of reception of the base station. As such, the frames of FBMC symbols coming from different UEs arrive synchronously at the base station.

Figure 7:
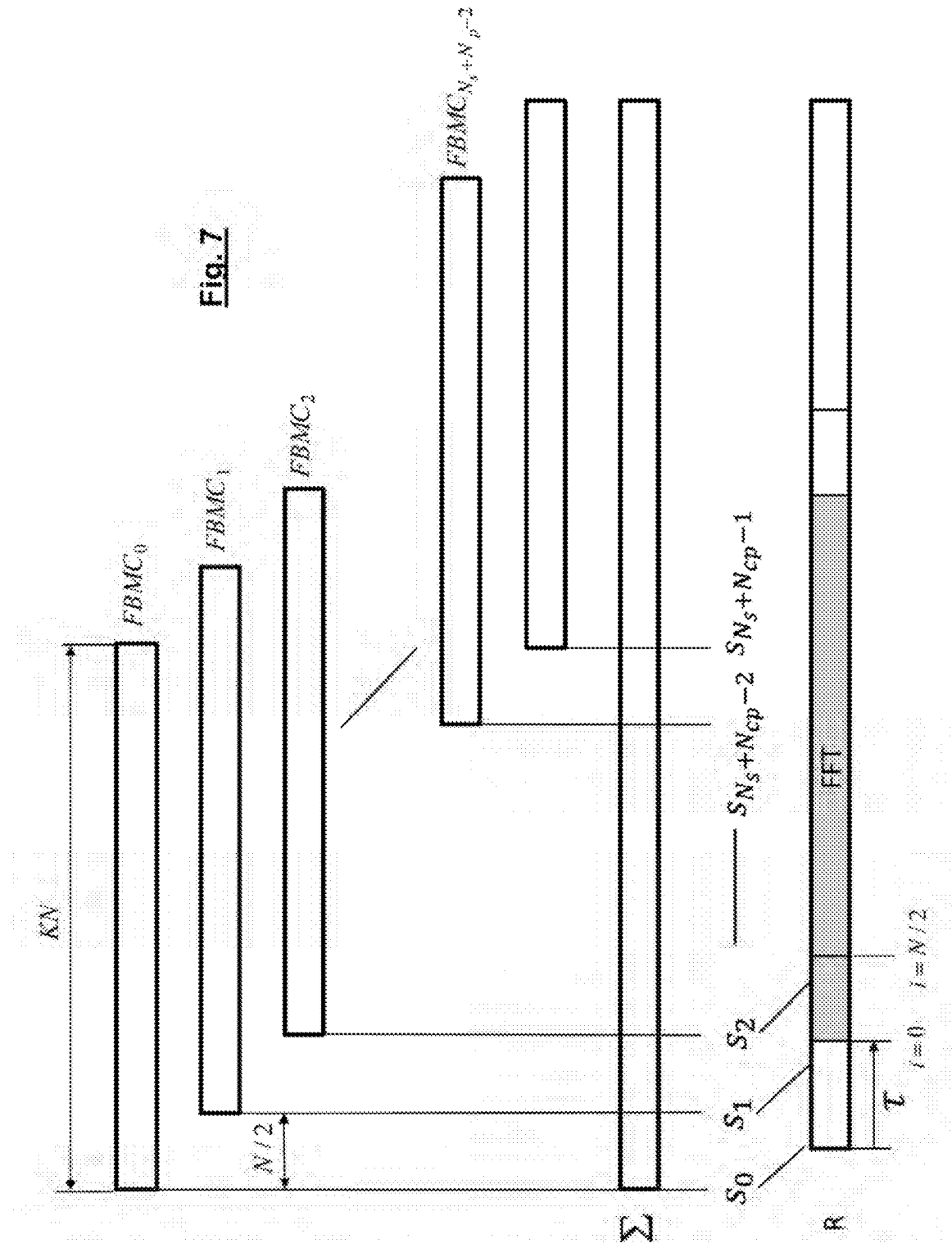
FIG. 7 diagrammatically shows a frame of FBMC symbols emitted and received on the RACH channel.

The FIG. 7 diagrammatically shows, in the time domain, a frame of FBMC symbols emitted on the RACH channel by the emitter of FIG. 4 and received by the receiver of FIG. 6.

As indicated in relation with FIG. 3, each FBMC symbol is formed of KN samples, with two successive FBMC symbols being offset by N/2 samples. The output of the emitter FBMC has been designated by Σ. Recall that the latter is obtained by the adding of 2K−1 successive FBMC symbols.

On the receiver, the FBMC signal is received with a delay that corresponds to the propagation time between the UE and the base station. It has been designated by R in the figure.

In what follows, $s_k$ is noted as the first sample of the $k^{bmc}$ FBMC symbol, noted as $FBMC_k$. FIG. 7 indicates the beginning of each one of the $N_s + N_{cp}$ FBMC symbols intervening in the frame of the RACH channel namely, $s_k, k=0, \ldots, N_s + N_{cp} - 1$.

The starting point of the sliding FFT is conventionally taken at a reference sample i=0. This starting point is incremented until the sample i=N/2, in order to sweep a search zone of amplitude N/2. This amplitude of the search zone ensures that there will necessarily be during the sweeping, a value of i that corresponds to an alignment of the FFT window with an FBMC symbol. In the case shown, this alignment occurs when the starting point coincides with the first sample of the symbol $FBMC_2$, noted as $s_2$.

Figure 8:
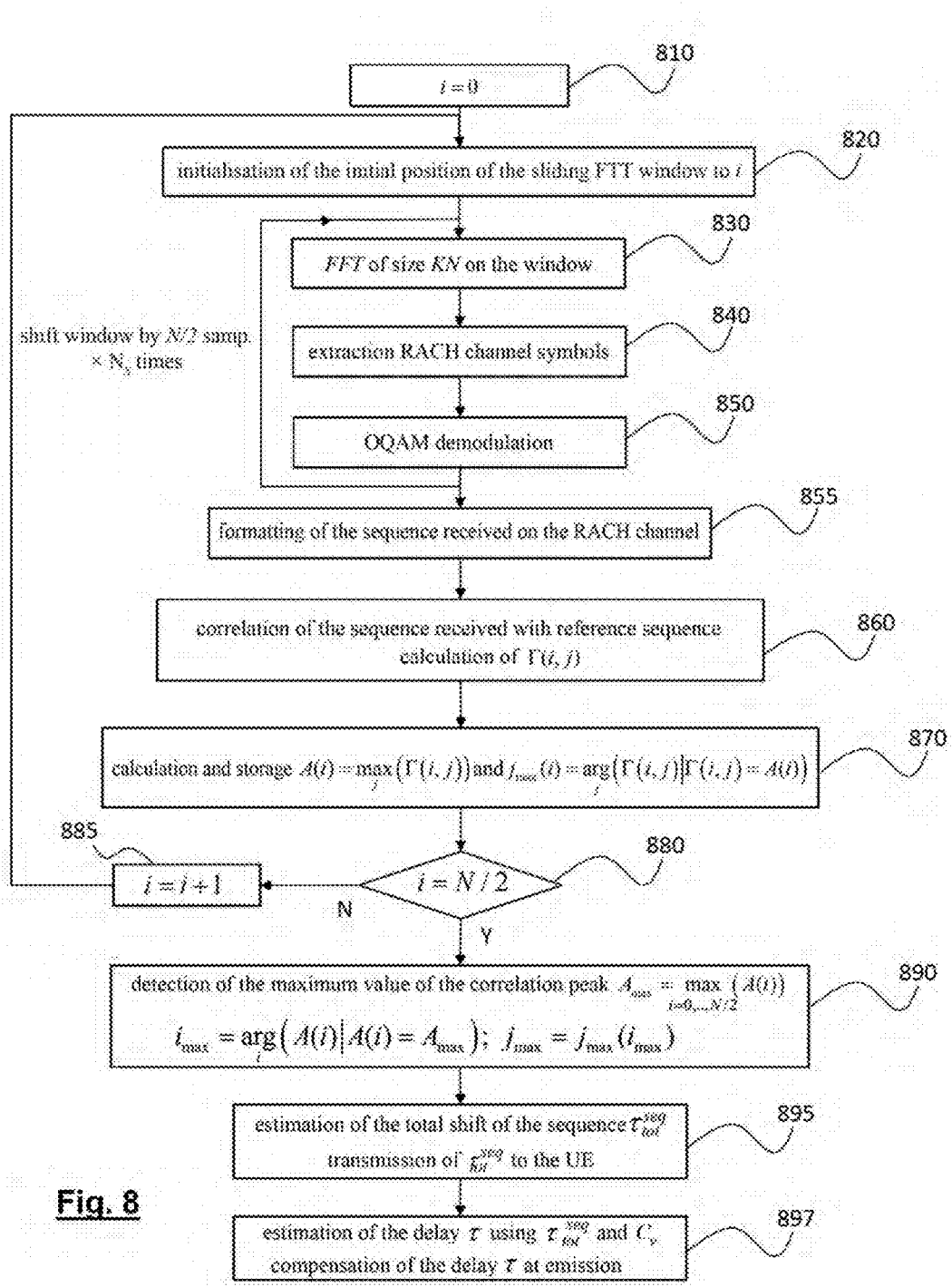
FIG. 8 shows a flowchart of a method for synchronising an emitter on an FBMC system, according to a first embodiment of the invention.

FIG. 8 shows a flowchart of a method for synchronising an emitter of an FBMC system, according to a first embodiment of the invention.

It is assumed that the emitter has the structure already described in relation with FIG. 4 and that the receiver has the structure already described in relation with FIG. 6.

The synchronisation of the emitter implements the steps 810-895 at the receiver and the step 897 at the emitter.

In the step 810, the index is i=0.

In the step 820, the starting position of the sliding window of the FFT at the sample of index i is initialised. The FBMC receiver then considers the sample of index i as the first of the sequence of samples of the frame FBMC.

In the step 830, the KN samples of the sliding window beginning with the sample i are subjected to an FFT of size KN in the FFT module 670. The samples at the output of the FFT are furthermore subjected to a filtering and a spectral despreading to the module 680.

In the step 840, the $N_p$ OQAM symbols that correspond to the RACH channel are extracted.

In the step 850, the demodulator 686 converts the OQAM symbols into real values, corresponding to elements of the pseudo-random sequence. Where applicable, a hard decision is applied on the values of the sequence in order to obtain an estimation of the elements of the sequence.

The steps 830 to 850 are carried out $N_x$ times, by translating each time the FFT window by N/2 samples. Each iteration supplies $N_p$ elements of the sequence. A number $N_x, N_p$ of real values is as such obtained.

In the step 855, the formatting module 687 arranges these real values by placing end-to-end the portions of sequence acquired at each FBMC symbol. This formatting can be carried out simply by storing the portions of sequence one after the other in a buffer as they are supplied by the step 850.

In the step 860, using the correlator 688, a correlation is carried out of the sequence obtained in the preceding step with the reference sequence. A sequence of values Γ(i,j) is as such obtained where j is a correlation position, in other words an offset of the sequence in question in relation to the reference sequence. The position j is expressed as a number of elements of the pseudo-random sequence where j varies from 0 to L−1 where L is the length of the reference sequence.

According to an alternative, it is possible in the step 850 to take into account the complex values (not only the real values) at the output of the OQAM demodulator. This sequence is the correlated in 860 with the reference sequence which itself was subjected to a OQAM modulation. The correlation is therefore carried out on the basis of the hermitian product of the two sequences in question. This variant makes it possible to achieve a correlation result with a better signal-to-noise ratio given that the information carried by an element of the sequence is distributed by the transmultiplexer over several adjacent subcarriers and instants.

In the step 870, the processing module 689 calculates a metric of the correlation peak and stores it in memory. Advantageously, the metric is calculated by $$A(i) = \max_j(\Gamma(i, j)).$$

It is compared to a threshold value $$A(i) = \frac{\max_j(\Gamma(i, j))}{\overline{\Gamma}_i}$$

where $\overline{\Gamma}_i$ is the average value of $\Gamma(i,j)$ on the values $j=0, \ldots, L-1$ in order to reduce the rate of false alerts and non-detection. In any case, the index $$j_{max}(i) = \arg_j(\Gamma(i, j) \mid \Gamma(i, j) = A(i))$$

the correlation position for which this peak is reached, is also stored in memory.

In the step 880, it is verified if $i=N/2$. If this is not the case, i is incremented in 885 and control returns to step 820. On the other hand, if this is indeed the case, the entire search range $[0,N/2]$ has been swept and control passes to step 890.

In the step 890, the processing module, 689, determines the maximum value, $A_{max}$, of the metric of the correlation peak $A(i)$ in the search range $[0, N/2]$ and recovers in the memory, the correlation position $j_{max}(i)$ for which this maximum is reached, i.e.:

$$A_{max} = \max_{i=0,\ldots,N/2}(A(i)) \quad (4\text{-}1)$$

$$i_{max} = \arg_i(A(i) \mid A(i) = A_{max}) \quad (4\text{-}2)$$

$$j_{max} = j_{max}(i_{max}) \quad (4\text{-}3)$$

The processing module then determines using the index $i_{max}$ and the position $j_{max}$ the total offset, $\tau_{tot}^{seq}$ of the sequence as explained hereinbelow.

In the step 895, the total offset $\tau_{tot}^{seq}$, expressed as a number of elements of the pseudo-random sequence, is transmitted by the base station to the terminal (UE), in other words by the receiver to the emitter.

In the step 897, the emitter of the terminal estimates the delay $\tau$ using the total offset $\tau_{tot}^{seq}$ and the initial offset $C_v$, and synchronises its emission accordingly.

On the receiver, the delay $\tau$ is conventionally expressed as a number of samples the signal received, with the sampling period being T/N. This delay can be broken down into an integer multiple of N/2 and a fractional part (real) of n/2:

$$\tau = (\tau_{int}^5 \tau_{fmei}^s) N/2 \quad (5)$$

where $$\tau_{ent}^s = \left\lfloor \frac{\tau}{N/2} \right\rfloor$$

is the integer portion by default of $$\frac{\tau}{N/2},$$

in other words the index k of the last sample $s_2$ preceding the reference sample.

The delay $\tau$ results in a delay $\tau_{flow}^{seq}$ in the number of samples of the pseudo-random sequence:

$$\tau_{flow}^{seq} = (\tau_{int}^5 + \tau_{int}^6) N_p \quad (6)$$

given that each FBMC symbol carries $N_p$ samples of the pseudo-random sequence.

The index $i_{max}$ corresponds to an alignment of the sliding window of the FFT with a starting of FBMC symbol (alignment on $s_2$ in FIG. 7), in other words:

$$i_{max} = \tau_{int}^3 \cdot N/2 \quad (7)$$

When the window of the FFT is aligned with the beginning of the FBMC symbol in question, the position of the correlation peak results, on the one hand, from the initial offset of the pseudo-random sequence in relation to the reference sequence and, on the other hand from the offset of the window of FFT in relation to the beginning of the frame FBMC, i.e.:

$$j_{max} = C_v + N_p \tau_{int}^5 \quad (8)$$

From (6), (7) and (8) the delay total of the sequence is deduced, $\tau_{int}^{seq} = C_v + \tau_{int}^{seq}$, i.e.:

$$\tau_{tot}^{seq} = C_v + \tau_{ent}^s \cdot N_p + \tau_{fract}^s \cdot N_p = j_{max} + \frac{2N_p}{N} i_{max} \quad (9)$$

As already indicated hereinabove, the delay $\tau_{tot}^{seq}$ is transmitted, in the step 895, to the terminal (identified by the offset $C_v$).

In the step 897, the emitter of the terminal can then estimate the delay $\tau$ to be compensated, expressed in a number of samples:

$$\tau = \frac{N}{2N_p}(\tau_{tot}^{seq} - C_v) \quad (10\text{-}1)$$

or, alternatively, expressed in time:

$$\tau = \frac{T}{2N_p}(\tau_{tot}^{seq} - C_v) \quad (10\text{-}2)$$

Figure 9:
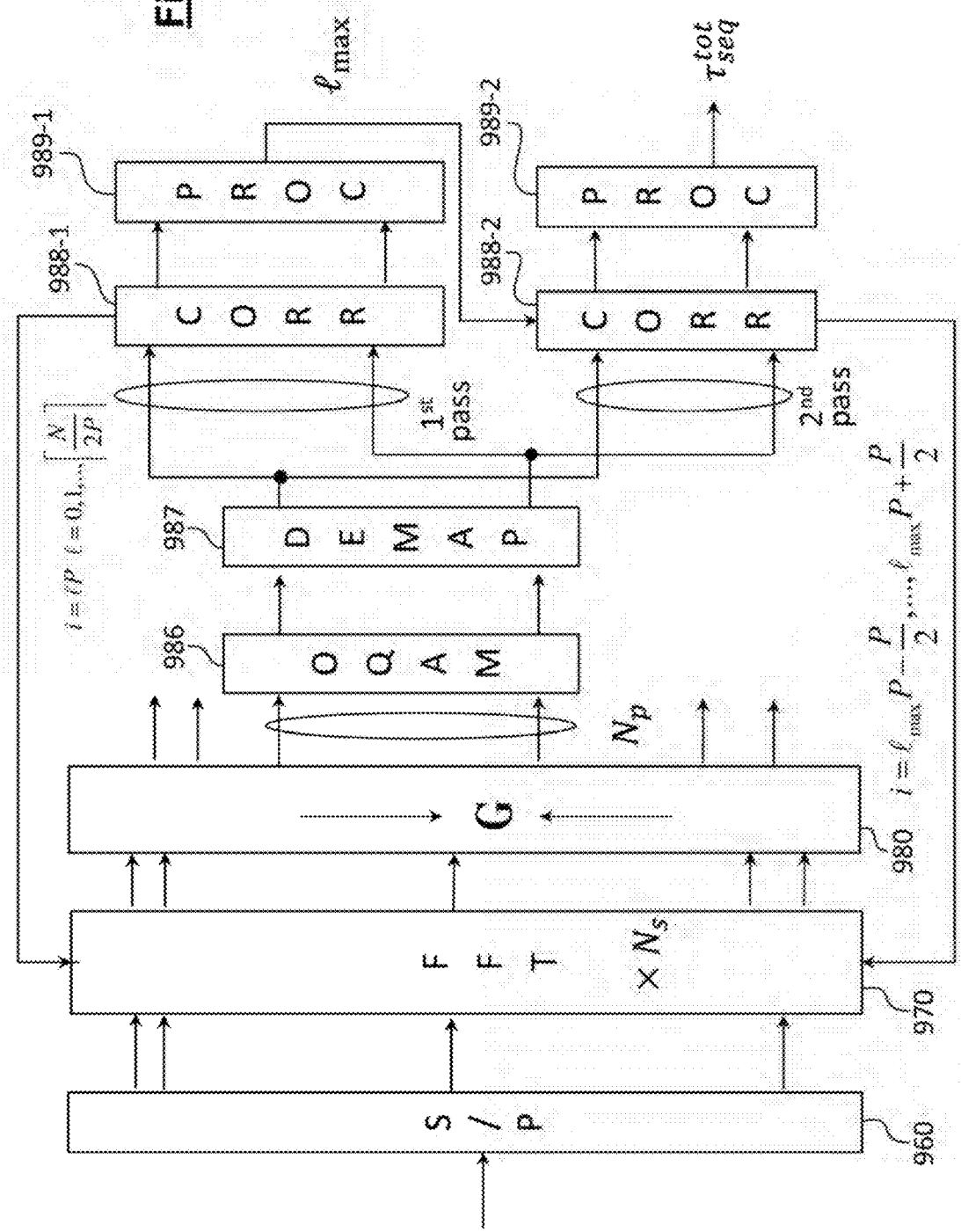
FIG. 9 diagrammatically shows the structure of an FBMC receiver of an FBMC system, according to a second embodiment of the invention.

FIG. 9 diagrammatically shows the structure of an FBMC receiver of an FBMC system, according to a second embodiment of the invention.

The second embodiment of the invention differs from the first in that the search for the correlation peak in the range [0,N/2] is done in two successive passes, with a first pass being carried out with a coarse resolution and with a second pass being carried out with a high resolution around the point found in the first pass.

The modules bearing the references 960-980, 986-987 are identical to those bearing the corresponding references 660-680, 686-687 in FIG. 6 and the description thereof shall accordingly be omitted here.

The values at the output of the formatting module 987 are subjected to a first correlation with the reference pseudo-random sequence in a first correlation module 988-1. Contrary to the first embodiment, the first correlation is repeated by incrementing the position i of the starting point of the sliding FFT by a step P>1 and this until $$i = \left\lceil \frac{N}{2P} \right\rceil P.$$

Typically, $N=2^M$ and the step P is chosen such that $P=2^m$ with $1 \leq m \leq M-1$.

For each starting point of the sliding FFT, i=lP with $$\ell = 0, 1, \ldots, \left\lceil \frac{N}{2P} \right\rceil,$$

N, FFT are carried out of size KN with an offset of N/2 samples between two successive windows, with the understanding that the first FFT starts at i. The correlation values obtained are supplied to the processing module 989-1. The latter determines, for each current position i=lP of the starting point of the sliding FFT, the value $$A^l(\ell P) = \max_j (\Gamma(\ell P, j))$$

of the correlation peak and determines at the end of the scanning the maximum value of the correlation peak, i.e.

$$A_{max}^l = \max_l (A_l(\ell P)),$$

as well as the position of the starting point for which this maximum value is reached $$\ell_{max} = \arg_l (A_l(\ell P) \mid A_l(\ell P) = A_{max}^l).$$

The index is supplied to the second correlation module 988-2.

The values at the output of the formatting module 987 are then subjected to a second correlation in the second correlation module 988-2. This second correlation is carried out again with the reference pseudo-random sequence but this time the correlation operation is repeated only over a reduced range of the index i, of a width equal to a step P namely iÅ

$$\left[ \ell_{max} P - \frac{P}{2}, \ell_{max} P + \frac{P}{2} \right].$$

For each position i of the starting point of the sliding FFT, a sequence of correlation values Γ(i, j) is obtained. It is understood that the correlation module 988-2 carries out the same operations as the module 688 of the first embodiment but only operates on a range of width P centred on the index determined by the processing module 989-1.

The processing module 989-2 then processes the correlation results supplied by the second correlation module 988-2. More precisely, it determines for each $$i \in \left[ \ell_{max} P - \frac{P}{2}, \ell_{max} P + \frac{P}{2} \right]$$

the amplitude $$A_{max}^2(i) = \max_j (\Gamma(i, j))$$

of the correlation peak and the offset $j_{max}(i)$ for this peak is reached.

The processing module 989-2 deduces from this the total offset $\tau_{tot}^{seq}$ of the pseudo-random sequence and transmits it to the terminal (UE) for time compensation of its emission as in the first embodiment.

Figure 10A:
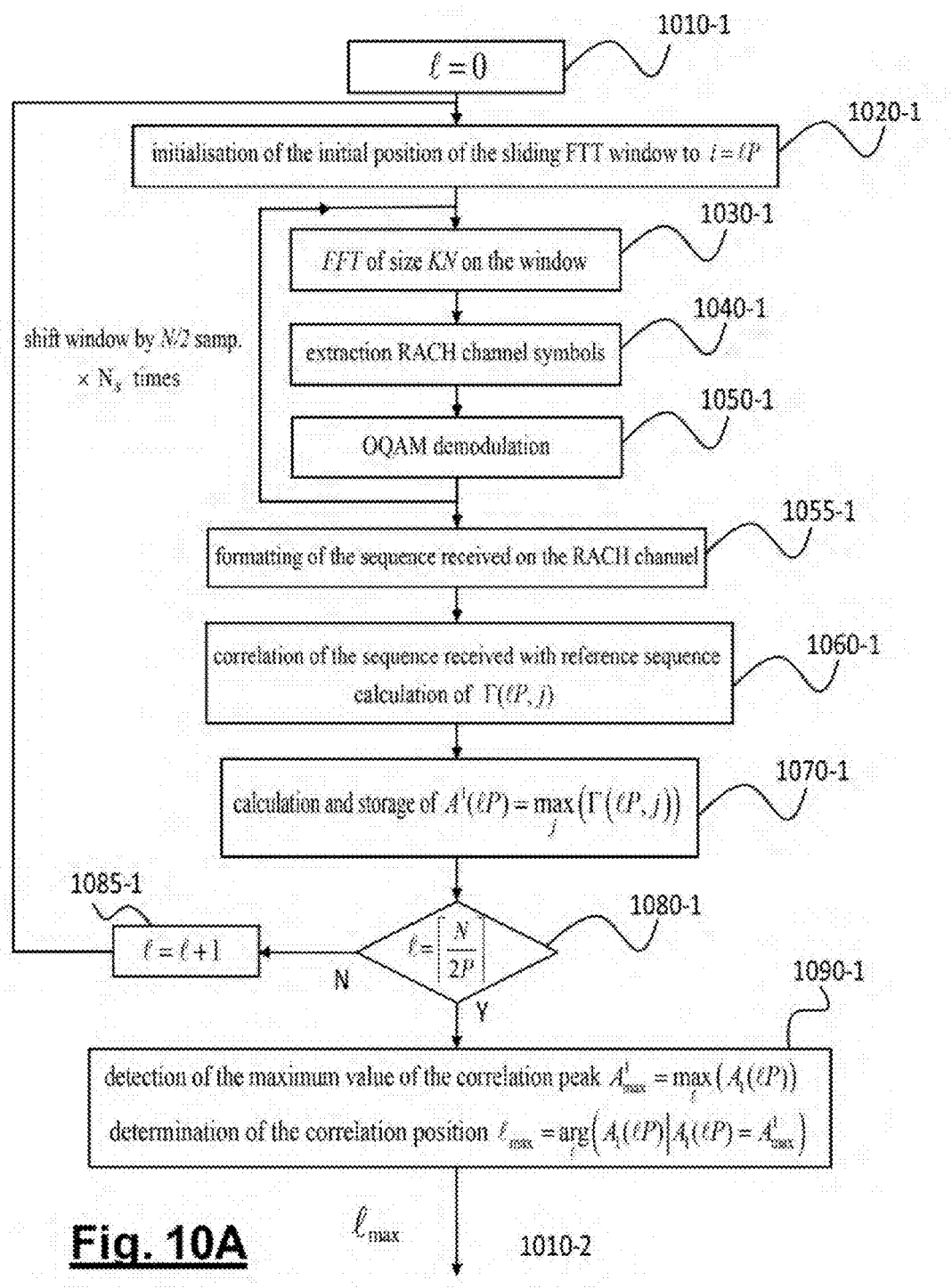
FIGS. 10A and 10B show in the form of a flowchart a coarse search and a fine search in the framework of a method for synchronising an emitter of FBMC system, according second embodiment of the invention.
Figure 10B:
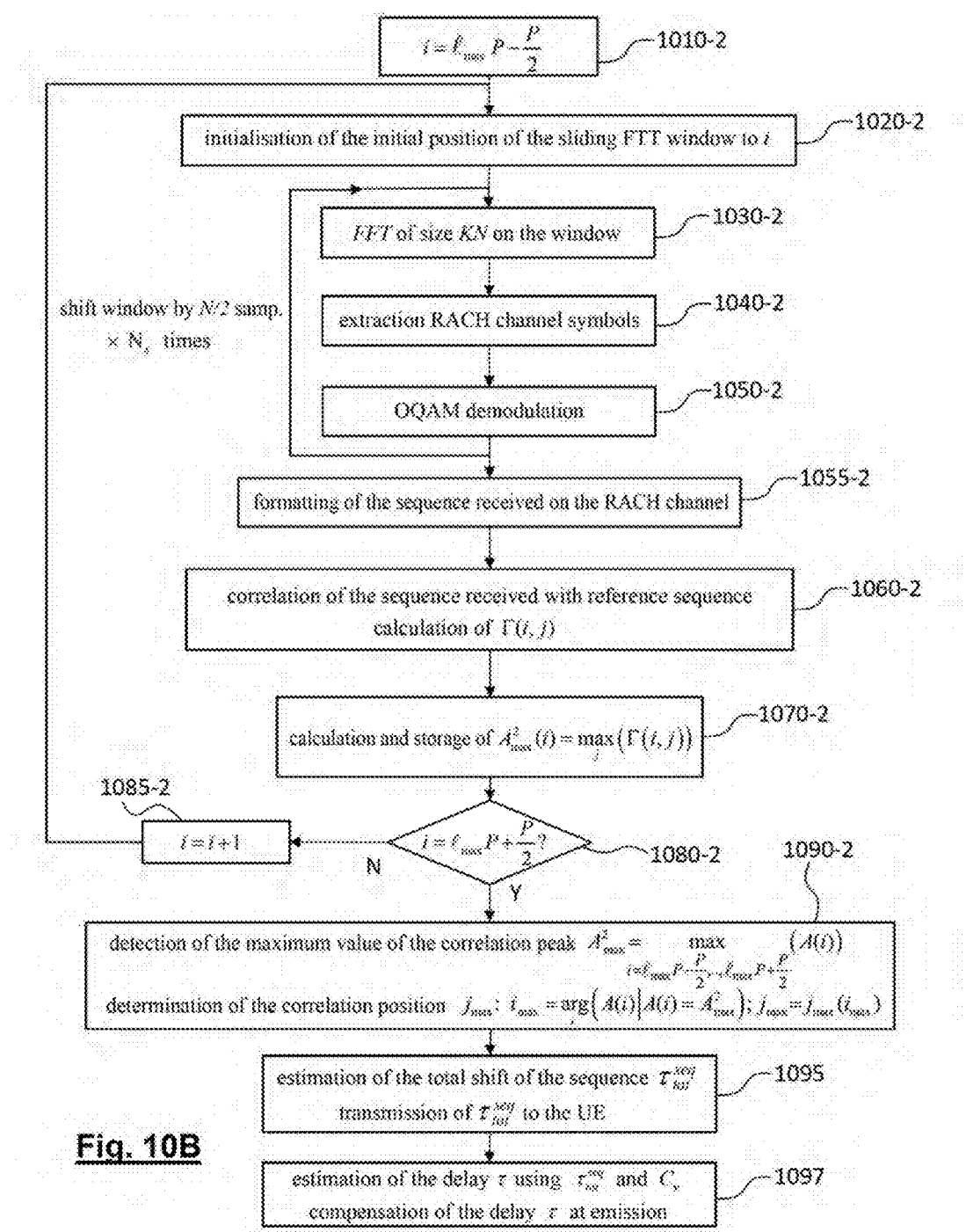

FIGS. 10A and 10B show in the form of a flowchart a first coarse search pass and a second fine search pass for a method for synchronisation of an emitter of an FBMC system, according to a second embodiment of the invention.

The method for synchronisation according to the second embodiment uses a receiver as described in relation with FIG. 9.

The synchronisation of the emitter implements, a first coarse search pass comprising the steps 1010 to 1090-1 executed on the receiver, a second fine research pass comprising the steps 1010-2 to 1095, also executed on the receiver and finally the step 1097 on the emitter (located in the terminal).

The first coarse search pass is detailed hereinafter:

In the step 1010-1 a first search loop (coarse) is initialised with l=0. The initial position of the sliding window of FFT is given by the index i=lP of the first sample of the window. This index is conventionally taken equal to 0.

The steps 1020-1 to 1055-1 are identical to the steps 810 to 855 already described in relation with FIG. 8 and no further details shall therefore be provided.

In the step 1060-1, by means of the first correlation module 988-1, a correlation is carried out of the sequence supplied b the formatting module with the reference pseudo-random sequence. A sequence of values Γ(lP, j) j=0, . . . , L−1 is thus obtained where L is the length of the pseudo-random sequence and i=lP is the current position of the window.

According to an alternative, the correlation can be carried out on the complex values (not only the real values) of the sequence received with the reference sequence modulated beforehand by a OQAM modulation, as explained in relation with the steps 850 and 860 of FIG. 8.

In the step 1070-1, the processing module 989-1 calculates a metric of the correlation peak $$A^1(\ell P) = \max_j(\Gamma(\ell P, j))$$

for the current position of the window of FFT. This metric is compared with a threshold value $$A^1(\ell P) = \frac{\max_j(\Gamma(\ell P, j))}{\Gamma_{lP}}$$

where $\Gamma_{cp}$ is the average value of $\Gamma(\text{lP}, j)$ taken on the values $j=0, \ldots, L-1$ in order to reduce the rate of false alerts and the rate of false detection.

In the step 1080-1, it is verified if $$\ell = \left\lceil \frac{N}{2P} \right\rceil.$$

If this is not the case l is incremented by 1, or equivalently i by P, in 1085-1 and control returns to step 1020-1 in order to carry out N, successive FFT starting from a new starting position. On the other hand, if this is indeed the case, the entire search range has been swept (with a coarse resolution) [0,N/2] and control passes to step 1090-1.

In the step 1090-1, the processing module 989-1 determines the maximum value of the correlation peak in the search range, namely $$A_{max}^1 = \max_\ell(A_1(\ell P))$$

as well as the index $l_{max}$ for which this value is reached.

Details cm the second fine search pass are provided hereinafter in relation with FIG. 10B.

In 1010-2 the second fin search loop is initialised with $$i = \ell_{max}P - \frac{P}{2}.$$

The steps 1020-2 to 1055-2 are identical to the preceding steps 1020-1 to 1055-1 and will not be described again.

In the step 1060-2, using the second correlation module 988-2, a correlation is carried out of the sequence supplied by the formatting module, with the reference pseudo-random sequence. Here again, the variant can be based on the real values or based on the complex values (and not only the real values) of the sequence received as explained in relation with the steps 850 and 860 of FIG. 8.

The correlation results $\Gamma(i, j), j=0, \ldots, L-1$, are processed in the following step.

In the step 1070-2 the processing module 989-2 processes the correlation results obtained in the preceding step in order to determine the metric of the correlation peak $$A_{max}^2(i) = \max_j(\Gamma(i, j)) \text{ or } A_{max}^2(i) = \frac{\max_j(\Gamma(i, j))}{\Gamma_i},$$

and the offset $j_{max}(i)$ for which this value is reached. The metric value $A_{max}^3(i)$ and the index $j_{max}(i)$ are stored in memory.

In the step 1080-2, it is verified if $$i = \ell_{max} + \frac{P}{2}.$$

If this is not the case i is incremented by 1 in 1085-2 and control returns to step 1020-2 in order to carry out $N_x$ successive FFT using a new starting position. On the other hand, if this is indeed the case, the entire fine search range $$\left[\ell_{max}P - \frac{P}{2}, \ell_{max}P + \frac{P}{2}\right]$$

has been swept and control passes to step 1090-2.

In the step 1090-2, the maximum value, $A_{max}^2$, of the metric of the correlation peak A(i) in the fine search range $$\left[\ell_{max}P - \frac{P}{2}, \ell_{max}P + \frac{P}{2}\right]$$

is determined and the correlation position $j_{max}(i)$ for which this maximum is reached is recovered from the memory, i.e.:

$$A_{max}^2 = \max_{i=\ell_{max}P-\frac{P}{2},\ldots,\ell_{max}P+\frac{P}{2}}(A(i)) \quad (11\text{-}1)$$

$$i_{max} = \arg_i(A(i) \mid A(i) = A_{max}^2) \quad (11\text{-}2)$$

$$j_{max} = j_{max}(i_{max}) \quad (11\text{-}3)$$

In the step 1095, the processing module 989-2 then determines the total delay of the sequence, $\tau_{tot}^{seq}$, using the values $i_{max}$ and $j_{max}$, by means of the expression (9). The delay $\tau_{tot}^{seq}$ is then transmitted to the emitter (identified by the offset $C_v$).

In the step 1097, the emitter estimates, using $\tau_{int}^{seq}$, the delay $\tau$ to be compensated, in terms of the number of samples, by means of the expression (10). It compensates its emission of the delay $\tau$ in order to be synchronous with the reception window of the receiver located on the base station.

Note that the number of operations of FFT carried out in the first embodiment is $$n_{FFT}^1 = \frac{N}{2}, N_s \quad (12\text{-}1)$$

$$n_{FFT}^2 = \left(\left\lceil \frac{N}{2P} \right\rceil + P\right)N_s \quad (12\text{-}2)$$

In the second embodiment, the value P that minimises the number of FFT can be suitably chosen. This minimum is obtained by cancelling the derivative of the expression (12-2), i.e. for $$P = \left\lceil \sqrt{\frac{N}{2}} \right\rceil.$$

Those skilled in the art will understand that other embodiments can be considered by those skilled in the art without however leaving the scope of this invention. In particular, in order to determine $i_{max}$ and $j_{max}$, it can be considered to carry out a succession of search passes with increasingly smaller resolution steps. As such, instead of the two search passes of FIGS. 10A and 10B, a plurality Q of successive passes could be carried out, with these Q passes making it possible to progressively refine the detection of the correlation peak amplitude, with the last of these passes supplying furthermore the correlation position for which this maximum is reached.

The invention claimed is:

1. A method for synchronising an emitter with a receiver of a Filter Bank Multi-Carrier (FBMC) system, wherein a pseudo-random sequence is inserted on the emitter, in an access channel defined by an interval of subcarriers of an FBMC frame, said pseudo-random sequence having a given offset, $C_v$, with respect to a reference sequence with real values, the method comprising:
   (a) carrying out, by the receiver, a sliding fast Fourier transform (FFT) of a received signal of size KN using a starting sample with a given index (i=0), with a window of the FFT sliding by N/2 samples between two successive FFT where N is a number of subcarriers of an FBMC symbol and K is an overlapping factor;
   (b) extracting from FFT results, by the receiver, a sequence received and correlating the sequence received with the reference sequence;
   (c) determining, by the receiver, a correlation peak between the sequence received and the reference sequence and, with respect to the index of the starting sample, storing a metric of the correlation peak in memory as well as a correlation position that corresponds to the correlation peak,
   steps (a), (b), (c) being repeated for a plurality of indexes of the starting sample;
   (d) determining, by the receiver, index, $i_{max}$, of the starting sample associated with the correlation peak of a maximum metric as well as a correlation position, $j_{max}$, corresponding to the maximum metric correlation peak;
   (e) determining, by the receiver, an offset, $\tau_{tot}^{seq}$, between the sequence received and the reference sequence using the index i, and the correlation position $j_{max}$, and transmitting by the receiver to the emitter, the offset determined as such; and
   (f) estimating, by the emitter, a delay using the offset determined as such and the given offset, and compensating for the delay at the emission.

2. The method for synchronising an emitter with a receiver of an FBMC system according to claim 1, wherein the steps (a), (b), (c) are repeated for N/2 successive indexes of the starting sample, with two successive indexes being separated by 1.

3. The method for synchronising an emitter with a receiver of an FBMC system according to claim 2, wherein in step (f) a delay $\tau$ is estimated by the emitter using $$\tau = \frac{N}{2N_p}(\tau_{tot}^{seq} - C_v)$$

where $N_p$ is a number of subcarriers of the interval of subcarriers of said access channel.

4. The method for synchronising an emitter with a receiver of an FBMC system according to claim 1, wherein the steps (a), (b), (c) are repeated a first time, during a first search pass, for a first plurality $$\left\lceil \frac{N}{2P} \right\rceil$$

of indexes of the starting sample, with two successive indexes being separated by P where P is a quantification step denominated in number of samples, and the steps (a), (b), (c) are repeated at least a second time, during a second search pass, for a second plurality P of indexes in a range $$\left[ \ell_{max}P - \frac{P}{2}, \ell_{max}P + \frac{P}{2} \right],$$

where $l_{max}$ is an estimate index in the first search pass.

5. The method for synchronising an emitter with a receiver of an FBMC system according to claim 4, wherein the index $l_{max}P$ is determined, during the first search pass, as one belonging to the first plurality of starting sample indexes and associated with a first maximum value of a metric of the correlation peak ($A_{max}^1$) of the sequence received with the reference sequence, with said first maximum value being obtained on said first plurality of indexes.

6. The method for synchronising an emitter with a receiver of an FBMC system according to claim 5, wherein, the index $i_{max}$ of the starting sample is determined, during the second search pass, as one belonging to the second plurality of starting sample indexes and associated with a second maximum value of a metric of the correlation peak ($A_{max}^2$) of the sequence received with the reference sequence, with said second maximum value being obtained on said second plurality of indexes.

7. The method for synchronising an emitter with a receiver of an FBMC system according to claim 6, wherein the correlation position, $j_{max}$, corresponding to the correlation peak of maximum amplitude during the second search pass, is determined.

8. The method for synchronising an emitter with a receiver of an FBMC system according to claim 7, wherein the offset, $\tau_{tot}^{seq}$, between the sequence received and the reference sequence is obtained using the index $i_{max}$ and the correlation position $j_{max}$, such as determined by the second search pass.

9. The method for synchronising an emitter with a receiver of an FBMC system according to claim 8, wherein the delay $\tau$ is estimated by the emitter using $$\tau = \frac{N}{2N_p}(\tau_{tot}^{seq} - C_v)$$

where $N_p$ is the number of subcarriers of the interval of subcarriers of said access channel.

10. The method for synchronising an emitter with a receiver of an FBMC system according claim 1, wherein said reference sequence is a Gold sequence.

11. A method for a Filter Bank Multi-Carrier (FBMC) system, wherein a pseudo-random sequence is inserted on an emitter, in an access channel defined by an interval of subcarriers of an FBMC frame, said pseudo-random sequence having a given offset, $C_v$, with respect to a reference sequence with real values, the method comprising:

(a) carrying out, by a receiver, a sliding fast Fourier transform (FFT) of a received signal of size KN using a starting sample with a given index (i=0), with a window of the FFT sliding by N/2 samples between two successive FFT where N is a number of subcarriers of an FBMC symbol and K is an overlapping factor;

(b) extracting from FFT results, by the receiver, a sequence received and correlating the sequence received with the reference sequence;

(c) determining, by the receiver, a correlation peak between the sequence received and the reference sequence and, with respect to the index of the starting sample, storing a metric of the correlation peak in memory as well as a correlation position that corresponds to the correlation peak, steps (a), (b), (c) being repeated for a plurality of indexes of the starting sample;

(d) determining, by the receiver, index, $i_{max}$, of the starting sample associated with the correlation peak of a maximum metric as well as a correlation position, $j_{max}$, corresponding to the maximum metric correlation peak; and (e) determining, by the receiver, an offset, $\tau_{tot}^{seq}$, between the sequence received and the reference sequence using the index $i_{max}$ and the correlation position $j_{max}$, and transmitting, by the receiver to the emitter, the offset determined as such.

* * * * *